INVENTORS
Chester J. Barecki
Richard A. Morse
BY Dawson, Tilton, Fallon, and Bungmus
ATTORNEYS

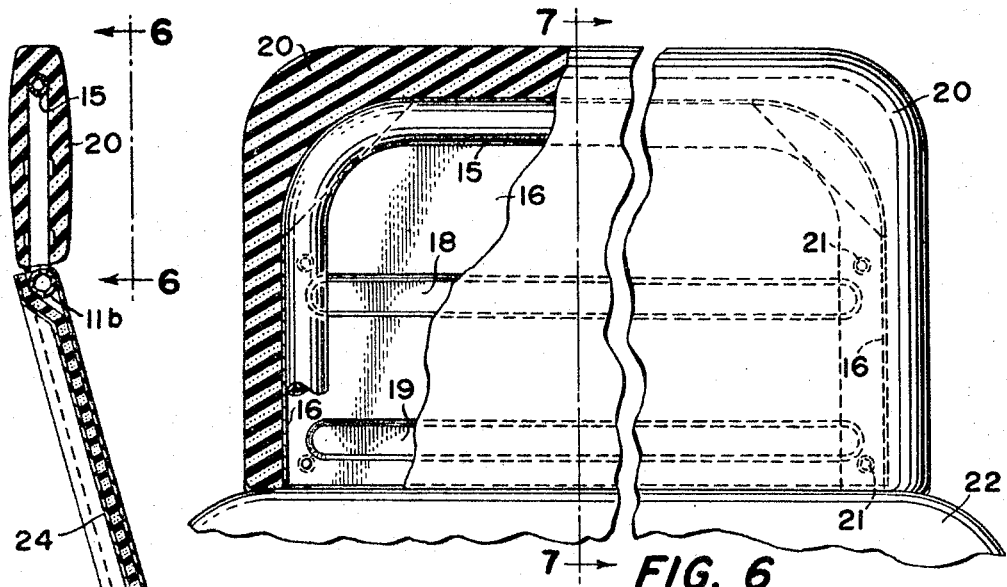
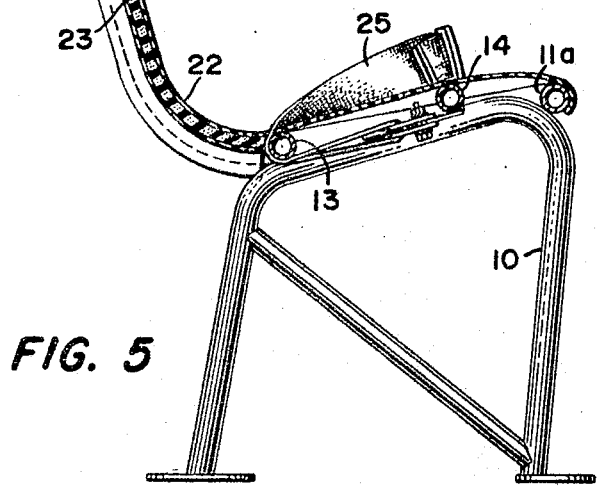
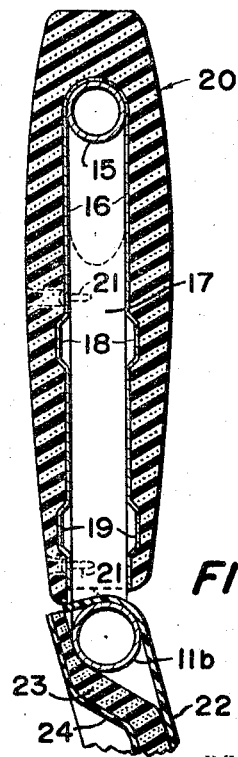

United States Patent Office 3,464,751
Patented Sept. 2, 1969

3,464,751
SAFETY SEAT STRUCTURE
Chester J. Barecki, Grand Rapids, and Richard A. Morse, Wyoming, Mich., assignors to American Seating Company, Grand Rapids, Mich., a corporation of Delaware
Filed Nov. 17, 1967, Ser. No. 683,976
Int. Cl. B60r 21/10
U.S. Cl. 297—216                                   4 Claims

ABSTRACT OF THE DISCLOSURE

A vehicle seat back is provided with a frame extension at its top carrying a malleable energy-absorbing metal web with a resilient covering or cushion about it, the metal serving as an energy-absorbing barrier in the case of a collision or sudden deceleration of the vehicle and protecting the head of the seat occupants. The seat back is provided with a molded glass fiber body provided with padding interposed between panels.

BACKGROUND AND SUMMARY

In a vehicle crash situation where there is sudden deceleration, the energy of the passenger's body, because of its motion, is kinetic, that is, actual energy, and it is important that some means be provided to protect the passenger and particularly the head of the passenger for survival. The seat back extension provides a deformable metal web which will absorb energy of the head impact in the case of sudden deceleration of the vehicle where the extension barrier is ahead of the occupant, while also protecting the occupant from whiplash effects during a rear end collision where the barrier is behind the occupant. The barrier holds the passenger or occupant from being catapulted forwardly in the case of sudden deceleration of the vehicle, while at the same time the malleable metal of the barrier absorbs kinetic energy, deforms generally to the contour of the head striking the barrier, and thus greatly reduces the likelihood of injury. A covering or cushion of resilient material prevents cuts and contusions while the metal structure through deformation will absorb energy from the head impact.

DRAWINGS

Figure 1:
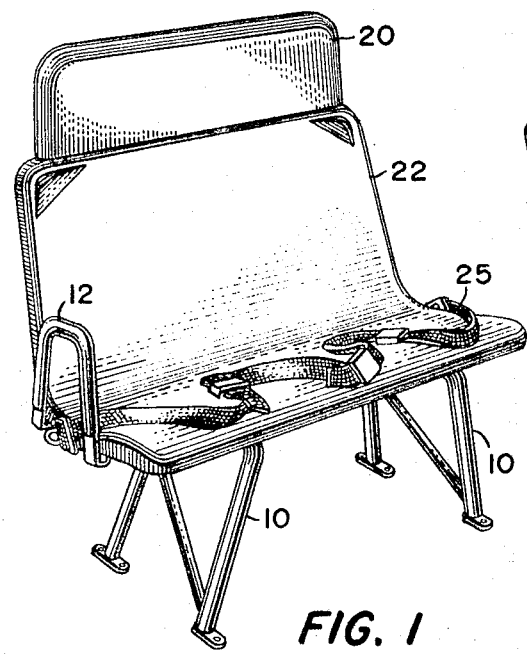
Figure 2:
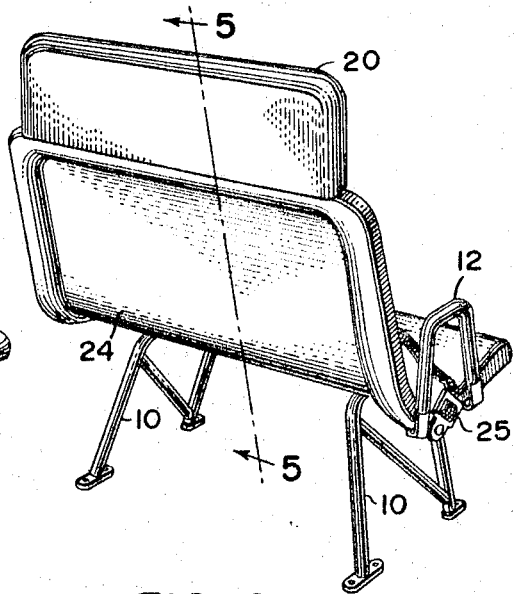
Figure 3:
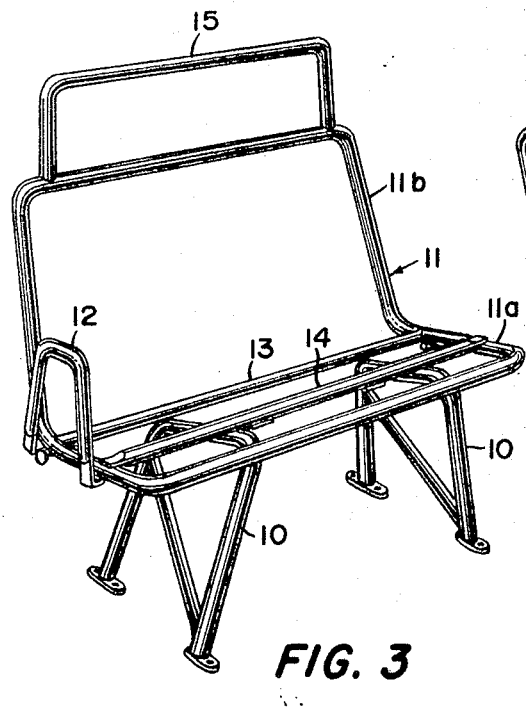
Figure 4:
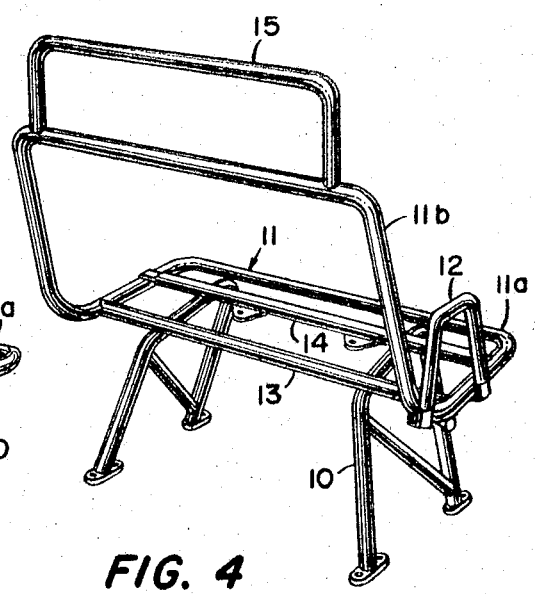

FIG. 1 is a perspective front view of a safety seat embodying our invention; FIG. 2, a perspective rear view of the seat; FIG. 3, a front perspective view of the seat frame; FIG. 4, a rear perspective view of the seat frame; FIG. 5, a vertical sectional view, the section being taken as indicated at line 5—5 of FIG. 2; FIG. 6, a broken front view in elevation of the head rest or panel, with part of the padding cut away to show the interior construction; and FIG. 7, a broken sectional detail view, the section being taken as indicated at line 7—7 of FIG. 6.

DETAILED DESCRIPTION

In the structure shown in FIGS. 1-7, 10 designates the legs or supports forming the base of the seat. Above the base 10 is supported a frame 11 providing a seat portion 11a and a back portion 11b. If desired, an arm rest support 12 may be provided. The seat portion 11a may be provided with cross tubes 13 and 14, as shown best in FIGS. 3 and 4.

Welded to the top of the seat back 11b is a barrier or safety panel frame 15. The frame 15 is in the shape of an inverted U having its ends anchored fixedly to the top of seat back 11b.

Extending over the frame 15 is a capsule 16 of thin deformable metal which is designed to yield under impact from the occupant's head so as to absorb the energy of the impact. The web of the capsule 16 encloses the frame 15, as shown best in FIG. 7, and provides an air space 17 between the front and rear web portions. If desired, the thin web may be provided centrally with longitudinal embossers or channels 18, and the bottom portion of the web may be similarly reinforced with embossed ribs 19.

Enclosing the metal web member 16 is a cushion 20 which may be formed of polyurethane foam or other plastic or cushion material which serves to prevent cuts or contusions in the case of head contact with the barrier structure. The cover 20 may be placed in position by slipping it over the metal member 16 and it may be fixed in position by screws 21 extending through the rear side of the structure, as shown in FIG. 7. In case the cushion is damaged, the screws may be readily removed and the cushion lifted off and then replaced with a new cushion.

The seat back may be formed of any suitable material. In the illustration given, a panel 22 formed of glass fiberboard or other suitable material may be extended from the top of the seat frame downwardly and also over the seat frame, as shown best in FIG. 5. We prefer to unite to the panel 15 a resilient foam body 23 having a rear covering 24 united thereto; as, for example, the foam padding may consist of polyurethane foam and the covering 24 may consist of a vinyl plastic sheet secured thereto. The foregoing structure is preferably formed to fit the back panel and may be cemented to the back panel and back tube in a single operation, thus providing in effect an upholstered padded back panel structure.

In the operation of the safety seat, the barrier or safety panel above the back seat protects the occupant of the rear seat against being catapulted forwardly in the case of sudden deceleration of the vehicle while at the same time protects the head of the rear occupant by the yielding of the metal web 16 under head impact. The thin metal yields into air space 17 while absorbing energy and, in effect, exerting a braking effect so as to prevent injury to the occupant. Not only does the malleable metal yield to absorb energy but also it yields in a manner conforming to the shape of the head portion striking it so as to distribute the force uniformly over a wide area. The cushion covering prevents cuts and contusions while also serving as a cushion and spreading the area of contact between the head and the barrier panel.

The cushion back structure provides a sturdy support for the occupant while also providing a cushioning effect.

We prefer to equip the seat frame with safety belts 25, as shown more clearly in FIG. 5.

While in the foregoing specification we have set out specific structure in considerable detail for the purpose of illustrating embodiments of our invention, such details may be varied widely by those skilled in the art without departing from the spirit of our invention.

We claim:
1. In combination with a seat back, a rigid barrier frame anchored to the top of said back and having a portion projecting above the seat back to provide a space therebetween, said barrier frame extending across said seat back, a web of malleable metal fixed at sides thereof to said frame and adapted to yield locally within said space under impact with a seat occupant's head while said sides are rigidly held by said frame, and a cushion cover enclosing said frame.

2. The structure of claim 1 in which said web is in the form of a capsule enclosing said barrier frame and providing an air space between front and rear web portions.

3. The structure of claim 1 in which said metal is malleable and does not shatter under head impact but yields incrementally with the force of head impact.

4. The structure of claim 1 in which said web is embossed to provide a longitudinal reinforcing rib.

References Cited

UNITED STATES PATENTS

| 2,982,342 | 5/1961 | Liljengren | 297—396 X |
| 3,086,813 | 4/1963 | Best et al. | 297—40 |
| 3,151,911 | 10/1964 | Eichorst | 297—397 |
| 3,172,702 | 3/1965 | Rose | 297—216 X |
| 3,397,911 | 8/1968 | Brosius | 297—216 |

JAMES T. McCALL, Primary Examiner

U.S. Cl. X.R.

297—386, 396